United States Patent [19]
Okuta et al.

[11] Patent Number: 5,802,224
[45] Date of Patent: Sep. 1, 1998

[54] OPTICAL COUPLER FOR PERFORMING LIGHT BRANCHING AND LIGHT MIXING/BRANCH FILTERING IN A LIGHT COMMUNICATION NETWORK

[75] Inventors: Michitaka Okuta, Tokyo; Kiyohiko Kuramoto, Hokkaido, both of Japan

[73] Assignee: Kyocera Corporation, Kyoto, Japan

[21] Appl. No.: 447,331

[22] Filed: May 22, 1995

[30] Foreign Application Priority Data

| May 23, 1994 | [JP] | Japan | 6-108211 |
| Jun. 13, 1994 | [JP] | Japan | 6-129960 |
| Dec. 27, 1994 | [JP] | Japan | 6-324730 |

[51] Int. Cl.⁶ .................................................. G02B 6/26
[52] U.S. Cl. ........................... 385/51; 385/43; 385/99
[58] Field of Search ............................. 385/24, 27, 39, 385/43, 50, 51, 95, 96, 99, 136, 137

[56] References Cited

U.S. PATENT DOCUMENTS

| 4,869,570 | 9/1989 | Yokohama et al. | 385/24 |
| 5,098,459 | 3/1992 | Fukuma et al. | 385/51 X |
| 5,170,451 | 12/1992 | Ohshima | 385/43 |
| 5,404,415 | 4/1995 | Mori et al. | 385/43 |
| 5,430,821 | 7/1995 | Sasoka et al. | 385/99 |
| 5,627,930 | 5/1997 | Ishiguro et al. | 385/51 |

FOREIGN PATENT DOCUMENTS

| 1284282 | 5/1991 | Canada | 385/43 |
| 174014 | 3/1986 | European Pat. Off. | |
| 241171 | 10/1987 | European Pat. Off. | |
| 3741284 | 6/1989 | Germany | |
| 4302133 | 7/1994 | Germany | |
| 60-140207 | 7/1985 | Japan | |
| 63-254406 | 10/1988 | Japan | 385/51 |
| 1-267603 | 10/1989 | Japan | 385/51 |
| 2-7009 | 1/1990 | Japan | 385/43 |
| 2199418 | 7/1988 | United Kingdom | 385/43 |

OTHER PUBLICATIONS

European Search Report, dated Oct. 3, 1995, Appl. No. 95107915.1.

*Primary Examiner*—John D. Lee

[57] ABSTRACT

A separate mount type optical coupler having composite functions in which, of a plurality of optical fibers ($f_1$, $f_2$ and $f_3$) arranged side by side, adjacent fibers are fusion-welded and extended at a plurality of places so as to provide, for example, a light mixing/branch-filtering function and a branching/coupling function individually, and the fusion-welded and extended portions are separately fixedly mounted, whereby connection portions and excessive length processing are eliminated.

15 Claims, 6 Drawing Sheets

OPTICAL COUPLER FOR PERFORMING LIGHT BRANCHING AND LIGHT MIXING/BRANCH FILTERING IN A LIGHT COMMUNICATION NETWORK

BACKGROUND OF THE INVENTION

The present invention relates to an optical coupler for use for performing light branching, light mixing/branch-filtering, or the like, in a light communication network.

When light of two different frequencies is branch-filtered into light of one frequency and light of another frequency and then the light of the one frequency is to be branched, it is necessary to provide a structure in which an individual light mixing/branch-filtering device and an individual light branching/coupling device are connected with each other. In that case, for making the connection portions, there are a fusion-welding method, and a mechanical splicing method. In either method, however, the connection portions are fixedly mounted by means of reinforcing supports and excessive length processing to make the fiber length between the parts long is required in order to ensure the reliability.

Further, in the case of a multiple-branching device, a plurality of 2-way branching devices are used through connections in the same manner as mentioned above, and therefore mounting is made with the same processing as above. In those cases, however, there are following disadvantages.

(1) There is a difficulty in making sure of the reliability for a long time in the connections realized by either the fusion-welding method or the mechanical splicing method.

(2) Since reinforcing supports are required in the connection portions and excessive length processing of the fiber between the parts is necessary for making sure of the reliability, performing the mounting can be both expensive and time consuming.

(3) For the above reasons, it is difficult to carry out mounting such as wiring within a casing, and so on, and it is difficult to realize miniaturization because a large space is required.

SUMMARY OF THE INVENTION

In order to solve the above problems, the present invention is configured to improve an mount structure of optical fiber parts for continuous connections of light mixing, light branch-filtering, light branching, light coupling, etc., in accordance with the characteristics of the parts, to thereby eliminate the connection portions of parts and the excessive length processing.

The present invention provides an optical coupler comprising: a plurality of optical fibers; a plurality of coupling portions, each formed such that at least two of the optical fibers are fusion-welded and extended; and individual mount members onto which the coupling portions are fixed respectively.

The present invention further provides an optical coupler comprising: three or more optical fibers arranged side by side; a plurality of coupling portions, each formed such that adjacent optical fibers are fusion-welded and extended to each other; and a single mount member onto which all the coupling portions are fixed.

The present invention further provides an optical coupler comprising: at least three optical fibers; at least one coupling portion, each formed such that selected two of the optical fibers are fusion-welded and extended to each other; and fixing means for fixing the coupling portion to the rest of the optical fibers to form a single bundle.

DETAILED DESCRIPTION OF THE PREFERRED EMBODIMENTS

Preferred embodiments of the present invention will be described below on the basis of the drawings.

Figure 1:
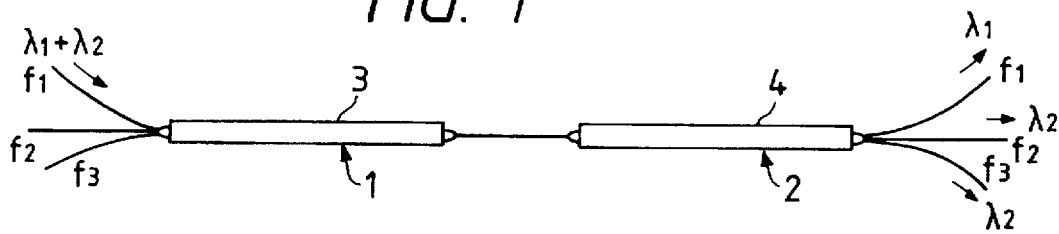
FIG. 1 is a view showing a separate mount type optical coupler which constitutes an embodiment of the present invention.
Figure 2:
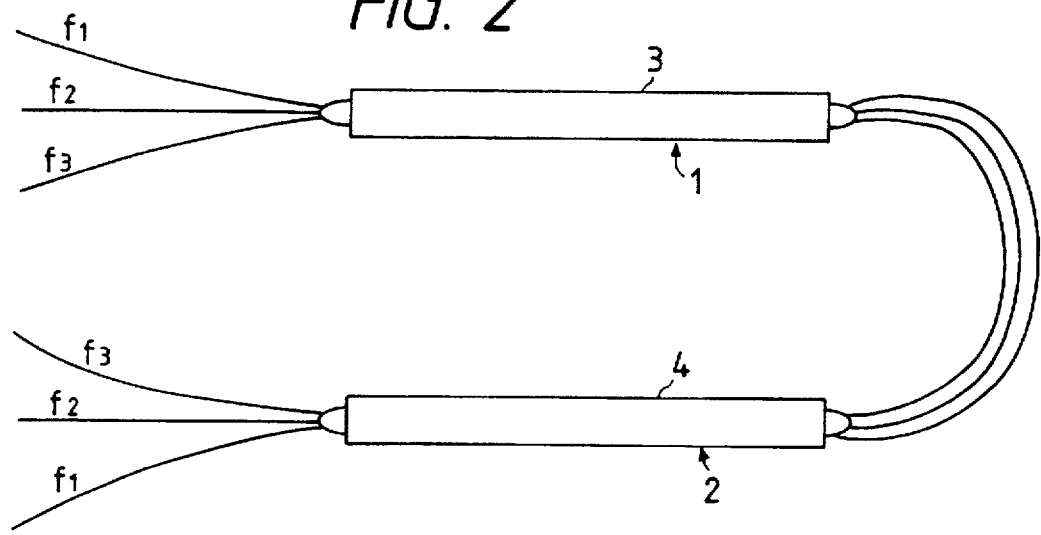
FIG. 2 is a view showing an example of provision of the separate mount type optical coupler of FIG. 1.

FIG. 1 shows a separation type optical coupler, which is an embodiment of the present invention, and in which light mixing/branch-filtering device 1 and light branching/coupling device 2 are configured through fusion-welding and extension so as to be adjacent to each other. That is, the light mixing/branch-filtering device 1 and light branching/coupling device 2 are separately mounted. As shown in FIG. 2, the configuration and mounting can be easily made in the state where portions of optical fibers $f_1$, $f_2$ and $f_3$ between the parts are bent. The process of manufacturing such a separate mount type optical coupler according to the present invention is such that the three optical fibers $f_1$, $f_2$ and $f_3$ are arranged side by side, and then the two optical fibers $f_1$ and $f_2$ of the three are fusion-welded and heat-extended to form the light mixing/branch-filtering device 1 and fixed within a mount casing 3. At this time, the residual optical fiber $f_3$ is kept separated from a heating source. Next, the optical fiber $f_2$ at one output side of the light mixing/branch-filtering device 1 and the residual optical fiber $f_3$ are arranged side by side, and fusion-welded and heat-extended to form the light branching/coupling device 2 and fixed within a mount casing 4. At this time, the optical fiber $f_1$ at the other output side of the light mixing/branch-filtering device 1 is kept separated from the heating source. If the fusion-welded and extended portions are thus configured adjacently to each other, it is possible to manufacture a separate mount type optical coupler including light mixing/branch-filtering device 1 and the light branching/coupling device 2 having no connection portions.

Figure 3:
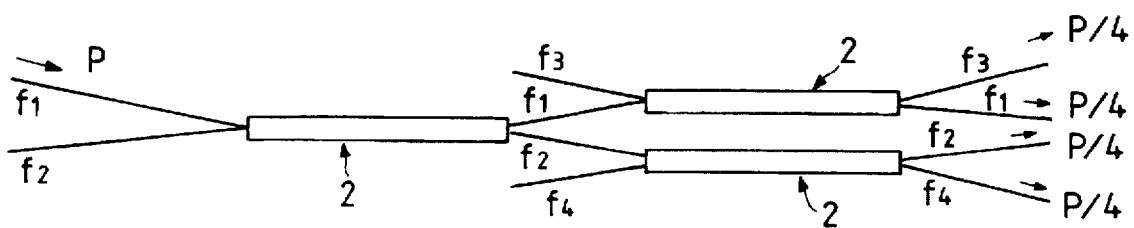
FIG. 3 is a view showing an example of application of the separate mount type optical coupler according to the present invention to a multiple branching device.

This applies to the case of multiple branching devices, and in this case the number of optical fibers to be arranged side by side varies in accordance with the number of branches. For example, in the case of a 4-way branching device, four optical fibers $f_1$, $f_2$, $f_3$ and $f_4$ are arranged side by side as shown in FIG. 3.

Further, in the case of separate mounting of a composite function coupler composed of the light mixing/branch-filtering device 1 and the light branching/coupling device 2, the configuration is made such that the three optical fibers $f_1$, $f_2$ and $f_3$ are arranged side by side and mounted as shown in FIG. 1. The present invention is however not limited to this configuration but it may be configured so that every two optical fibers are mounted through fixed mounting as shown in FIG. 3. In short, it is sufficient that no connection portions are provided between parts.

Accordingly, in the case of using a separate mount type optical coupler according to the present invention, there are advantages as follows.

(1) Since there is no connection portion between parts, the reliability is high and no loss due to connections is generated.

(2) Accordingly, it is not necessary to provide any connection reinforcing member, so that mounting is easy and price is low.

(3) Since there is no excessive length processing in mounting within the casing, required space is small and miniaturized mounting can be realized.

Next, referring to the FIGS. 4 to 6, a composite type optical coupler according to another embodiment of the present invention will be described below.

Figure 4:
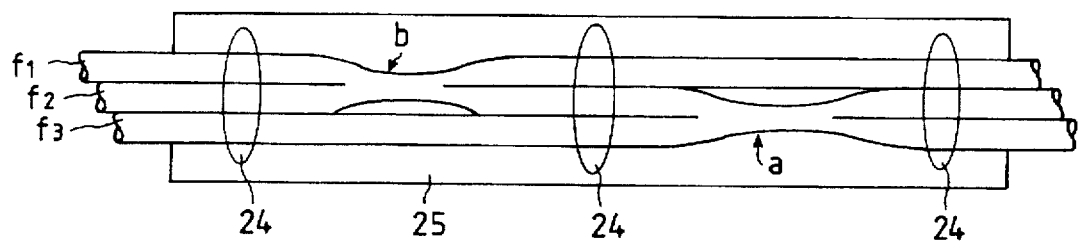
FIG. 4 is a view of inside configuration of a composite type optical coupler according to another embodiment of the present invention.
Figure 5:
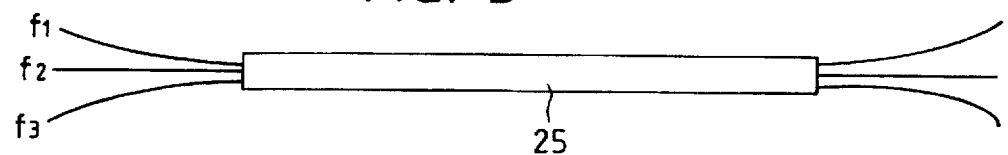
FIG. 5 is a view showing an external appearance of the composite type optical coupler shown in FIG. 4.

As shown in FIGS. 4 and 5, three optical fibers $f_1$, $f_2$ and $f_3$ are used and two fusion-welded and extended portions adjacent to each other are formed. Of those three optical fibers, the one-sided two optical fibers are fusion-welded and extended to form a light mixing/branch-filtering device a, and the other-sided two optical fibers are fusion-welded and extended to form a light branching/coupling device b adjacent longitudinally to the device a. The portion including those devices a and b is fixedly mounted in a package casing 25 by adhesion with an adhesive agent 24.

The light mixing/branch-filtering device a is a device for mixing/branch-filtering light and manufactured with a required wavelength. With respect to the light branching/coupling device b, it is possible to manufacture such a light branching/coupling device having a required branching ratio.

For example, description will be made as to the case where the fusion-welded and extended portion is used as a light separation device. Assume that it is possible to branch-filter light into two wavelengths 1.31 μm and 1.55 μm to be used. If the wavelength 1.55 μm is a through one, light of the other wavelength 1.31 μm is branched by means of a coupler adjacent to the through one. In the case where the fusion-welded and extended portion is used as a device such as an optical fiber amplifier, exciting light of 1.48 μm and signal light of 1.55 μm are mixed, and thereafter the optical wave of 1.55 μm is branched out (for rear excitation output monitoring).

Here, it is necessary to be careful in the following point. For example, when separate parts are used like prior art, it is necessary to use optical fibers to connect the parts to each other. In that case, since a large space is required if the optical fibers are arranged straight, the optical fibers are used in the bent state. Even in such a case, however, a radius of curvature of 60 mm is required in order to make sure of the reliability in strength of the optical fibers. Accordingly, an excessive length processing space for carrying out the bending is required additionally. Accordingly, if devices are configured adjacently to and integrally with each other like the light mixing/branch-filtering device a and the light branching/coupling device b according to the present invention, the space for the connection becomes unnecessary and the problem is solved. Further, when parts are connected to each other, fusion-welding connection or connector connection is used. At that time, there occurs loss due to reflection attenuation at the connection portion so that loss of about 0.1 dB~0.5 dB is added. In the structure according to the present invention, however, no loss occurs, and because no connection portion is present the reliability is improved. Further, it is a matter of course that no reinforcing member for the connection portions and no space therefor are required.

Figure 6:
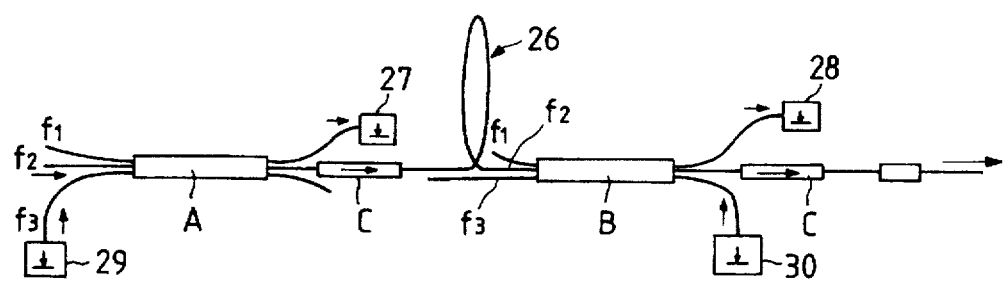
FIG. 6 is a configuration view showing an example that the composite type optical coupler of FIG. 4 is applied to an optical fiber amplifier.

FIG. 6 shows an example of the configuration of the optical fiber amplifier using the composite type optical coupler having the above-mentioned light branching/coupling and light mixing/branch-filtering functions. In FIG. 6, an in-line type optical isolator C is interposed between the composite type optical couplers A and B each having light branching/coupling and light mixing/branch-filtering functions, and optical fibers $f_2$ are connected to each other through a rare-earth-added optical fiber 26, and in use a signal light is inputted into the optical fiber $f_2$ of the optical coupler A. Monitoring photo-detectors 27 and 28 are connected to optical fibers $f_1$ so as to detect an output branched by a light branching/coupling device b in each of the couplers A and B. Exciting light sources 29 and 30 are connected to optical fibers $f_3$ so that signal light is mixed with exciting light by means of a light mixing device a.

In the above embodiment, description has been made about the case where three optical fibers arranged side by side are used. However, the present invention is not limited to such a case but it is applicable to the case of, for example, four or five optical fibers. For example, a 4-branching device which has been configured conventionally through connection-mounting of three 2-branching devices can be easily realized by the present invention in a manner such that four optical fibers are fusion-welded and extended at three places.

Thus, in the composite type optical coupler according to the present invention, the following superior advantages can be obtained.

(1) Since fusion-welded type parts having two functions are integrally configured, there is no connection portion compared with conventional one so that small-sized, low-loss, and highly-reliable parts are realized.

(2) Since only one part suffices, it is possible to expect lowering the price.

Referring to FIGS. 7 to 11B, an optical coupler using a substrate construction according to a further embodiment of the present invention will be described below.

Figure 7:
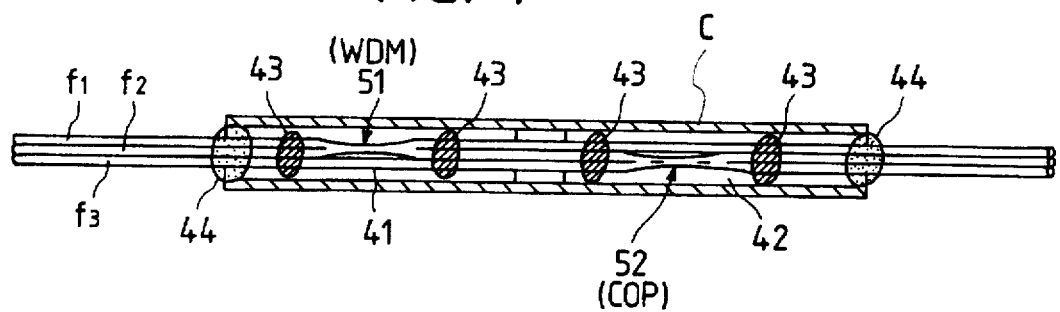
FIG. 7 shows an internal construction of an optical coupler which constitutes a further embodiment of the present invention.

FIG. 7 shows an internal construction of the optical coupler according to the embodiment, which has a light mixing/branch-filtering and a light branching/coupling functions. As similarly to the preceding embodiments, among three optical fibers $f_1$, $f_2$ and $f_3$, two optical fibers $f_1$, and $f_2$ are fusion-welded and extended to form a first coupling portion 11 which serves as a light mixing/branch-filtering device WDM and two optical fibers $f_2$ and $f_3$ are fusion-welded and extended to form a second coupling portion 52 adjacent to the first coupling portion 51, which serves as a light branching/coupling device COP. In this embodiment, two coupling portions 51 and 52 are incorporated in one outer casing C. The light mixing/branch-filtering device WDM is a device for mixing/branch-filtering transmitted light, and a desired light mixing/branch-filtering characteristic can be obtained such that a coupling length of the two fibers are adjusted during a thermally extending process. Similarly, the light branching/coupling device COP having a required branching ratio can be manufactured by adjusting the coupling length.

The light mixing/branch-filtering device WDM is mounted on and fixed to a first substrate 41 in such a manner that both ends of the device WDM are fixed the substrate 41 with fixing adhesive 43. Similarly, both ends of the light branching/coupling device COP are fixed onto a second substrate 42 with fixing adhesive 43. The first and second substrate 41 and 42 are accommodated in and fixed to the outer casing C, and then, openings at both ends of the outer casing C are closed by sealing agent 44.

In manufacturing optical fiber parts of the above-noted type, when the exposed fibers set juxtaposed to each other are heated and then fusion-welded and extended, a mode field diameter is increased by the core distance reduction and the simultaneous diameter reduction, so that coupling between adjacent fibers occurs. The coupling condition varies depending on the wave length to be used, and by adjusting the coupling length the desired light mixing/branch-filtering device or light branching/coupling device can be constructed.

The optical coupler wherein three fibers are set parallel to each other has been explained along FIG. 7. However, the present invention should not be restricted thereto or thereby, can also be applied to a construction of an optical coupler using more than three optical fibers.

Figure 8:
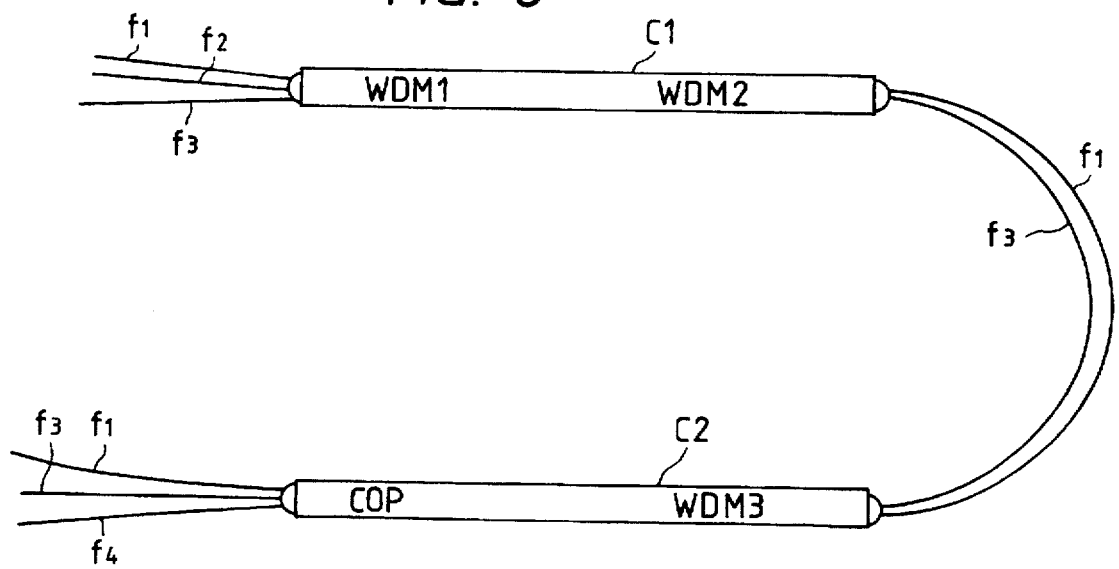
FIG. 8 is an external view of an optical coupler which constitutes further another embodiment of the present invention.
Figure 9A:
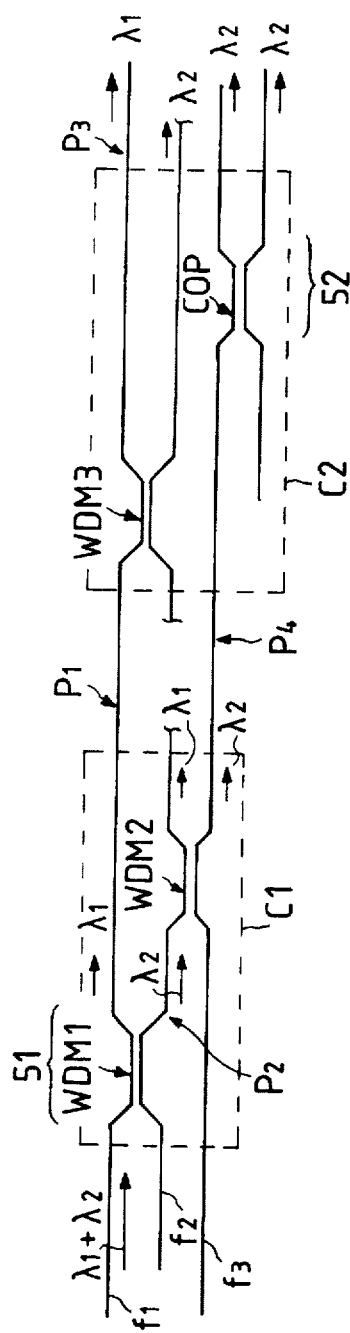
FIG. 9A shows an optical circuit of the optical coupler shown in FIG. 8
Figure 9B:
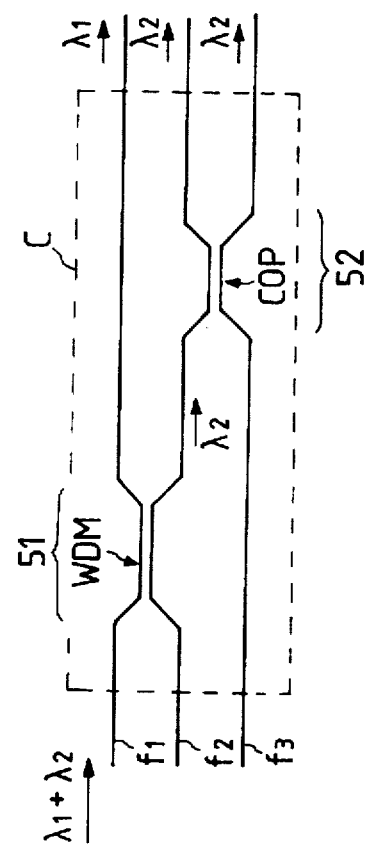
FIG. 9B is an enlarged view showing a blanketed portion of FIG. 9A.

FIG. 8 shows a further another embodiment of the present invention in which three fusion-welded and extended, coupling portions each having wave branch-filtering function are provided ($WDM_1$, $WDM_2$ and $WDM_3$). The optical circuit of this embodiment is shown in FIGS. 9A and 9B. At first, with the first light mixing/branch-filtering device $WDM_1$ the inputted light is branched into one having wave length $\lambda_1$ and one having wave length $\lambda_2$, and then the $\lambda_1$ component included in the $\lambda_2$ output from the $WDM_1$ is eliminated with the second light mixing/branch-filtering device $WDM_2$ so that the light having wave length $\lambda$ is outputted therefrom. According to this arrangement, the wave separation characteristic can be improved. For example, if the devices $WDM_1$ and $WDM_2$ are set to have approximately the same characteristic, the wave length separation characteristic of 2N dB can be obtained by this arrangement, supposing that one device has the wave length separation characteristic N dB. That is to say, according to this arrangement the wave length separation characteristic for obtaining desired wave lengths can be improved twice as compared to an arrangement using one device. Further, if the wave length separation characteristic of the $WDM_1$ and $WDM_2$ are set slightly shifted to each other, then it is possible to widen the band of the separated wave length (see FIGS. 11A and 11B).

The light of $\lambda_1$, passing through the first device $WDM_1$, is made incident into the third device $WDM_3$ and passes therethrough. Simultaneously, the remaining optical component of $\lambda_2$ is mixed with a light and eliminated from the light of $\lambda_1$ with the third device $WDM_3$ so that it is outputted therefrom. Thus, the above-noted arrangement provides the high wave length separation characteristic and enables to widen band of wave length separation.

Although this embodiment employs the arrangements that can provide the high wave length separation characteristic and the wide band characteristic for both the wave lengths of $\lambda_1$ and $\lambda_2$, it may be appreciated that the high separation and wide band characteristic is applied to the wave length of only one side. In this case, one light mixing/branch-filtering device WDM can be dispensed with. Further, although this embodiment uses two separate casings, i.e. a first outer casing $C_1$ for $WDM_1$ and $WDM_2$ and a second outer casing $C_2$ for $WDM_3$ and COP, the present invention should not be restricted thereto or thereby. For example, a single integral casing may be used for all light mixing/branch-filtering and/or branching/coupling devices, or otherwise three or more casing may be used therefor.

FIGS. 10A to 10E shows an example of manufacturing process for an optical coupler according to the present invention.

Figure 10A:
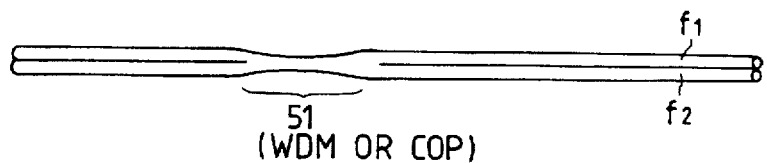
FIGS. 10A to 10E show an example of a process of manufacturing the optical coupler according to the present invention.
Figure 10B:
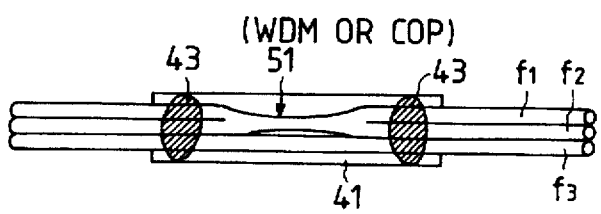
Figure 10C:
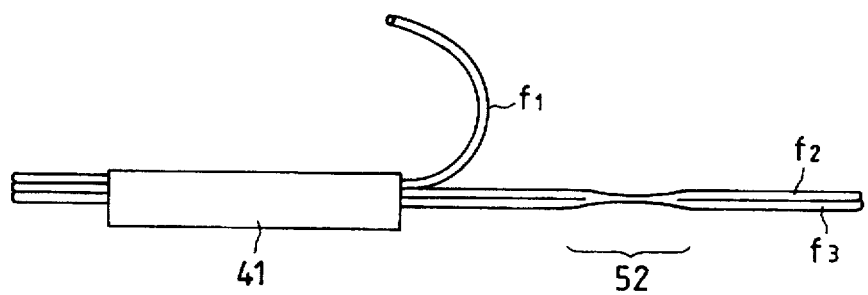
Figure 10D:
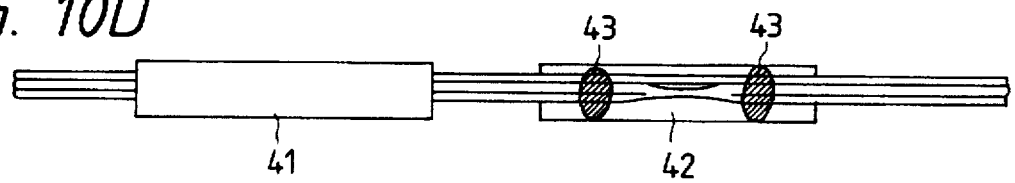
Figure 10E:
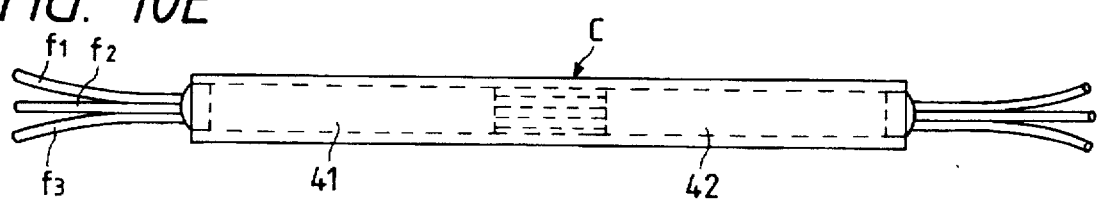
Figure 11A:
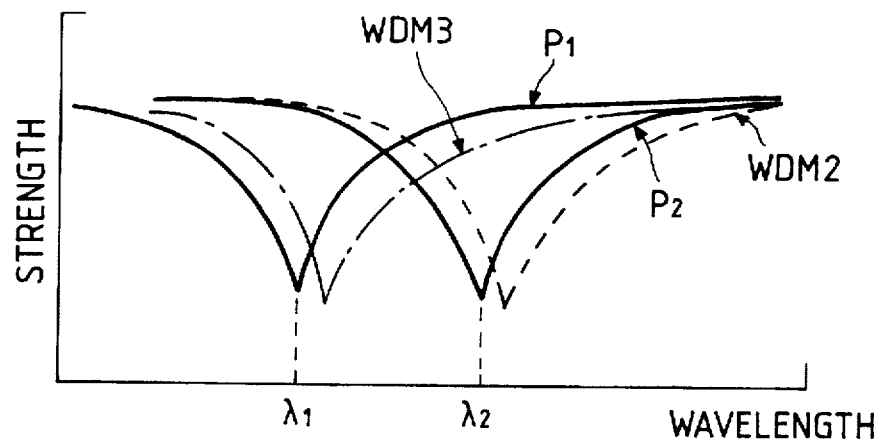
FIGS. 11A and 11B show wave length separation and band characteristic obtained by the optical coupler according to the present invention.
Figure 11B:
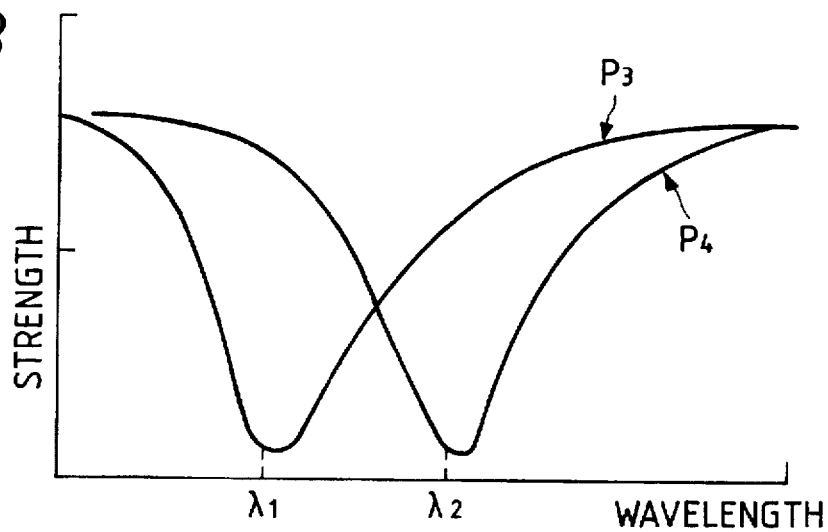

First, a light mixing/branch-filtering device WDM or a light branching/coupling device COP having a desired characteristic is constructed by adjusting a coupling length of a first fusion-welded and extended coupling portion 51 during a fusion-welding and extending step for closely contacted sheath or clad removed portions of optical fibers $f_1$, and $_2$ set parallel to each other (FIG. 10A). Then, another optical fiber $f_3$ is set parallel to the first fusion-welded and extended coupling portion 51, and the coupling portion 51 together with the optical fiber $f_3$ is fixed to a substrate 41 (FIG. 10B). The added optical fiber $f_3$ and the optical fiber $f_2$, other than the optical fiber $f_1$, are subjected to fusion-welding and extending step to provide a second fusion-welded and extended coupling porion 52 located adjacent to the first substrate 41 (FIG. 10C). Thereafter, the second coupling portion 52 together with the optical fiber $f_1$ is fixed to a second substrate 42 (FIG. 10D). Although the first and second substrate are separated longitudinally from each other in this example, these substrates may be closely contacted with each other for the purpose of obtaining a compact optical part. Then, the first and second substrates 41 and 42 are accommodated within and fixed to an outer casing C, and both ends of the outer casing C are sealed by sealing agent 44 (FIG. 10E).

According to the above-noted embodiment of the present invention, the following advantages can be obtained.

(1) Since fusion-welded type part having two functions is integrally configurated or constructed, there is no connection portion compared with conventional one so that small-sized, low-loss, and highly-reliable part can be obtained.

(2) since only one part suffices for the desired purpose, it is possible to dispense with generally required connection and mounting process of two parts, to thereby lower the cost.

(3) By further adding one or plural coupling portion(s) through fusion-welding and extending process as the desired number, a high performance part of required function can be manufactured.

(4) with a substrate interposed between a casing and a bundle of optical fibers, a construction can be reinforced.

What is claimed is:

1. An optical coupler, comprising:
 a plurality of optical fibers, a plurality of coupling portions, each of the coupling portions comprising at least two of the optical fibers that are fusion-welded and extended, and a plurality of individual mount members, each one of the coupling portions being fixed within and to a corresponding one of the mount members, wherein each one of the coupling portions is substantially completely surrounded by the corresponding one of the mount members.

2. The optical coupler of claim 1, wherein the plurality of coupling portions comprises at least a first coupling portion comprising a light mixing/branch-filtering device and a second coupling portion comprising a light branching/coupling device.

3. An optical coupler, comprising:

a plurality of optical fibers, a plurality of coupling portions, each of the coupling portions comprising at least two of the optical fibers that are fusion-welded and extended, and a plurality of individual mount members, each one of the coupling portions being fixed within and to a corresponding one of the mount members, wherein all of the optical fibers are fixed to each of the mount members.

4. An optical coupler, comprising:

a plurality of optical fibers, a plurality of coupling portions, each of the coupling portions comprising at least two of the optical fibers that are fusion-welded and extended, and a plurality of individual mount members, each one of the coupling portions being fixed within and to a corresponding one of the mount members, wherein all of the optical fibers are fixed together by adhesive in each of the mount members.

5. An optical coupler, comprising:

at least three optical fibers arranged side by side, a plurality of coupling portions, each one of the coupling portions comprising at least two adjacent optical fibers that are fusion-welded and extended to each other, and a single mount member within which all the coupling portions are fixed, wherein all the coupling portions are substantially completely surrounded by the single mount member.

6. The optical coupler of claim 5, wherein the plurality of coupling portions comprises at least a first coupling portion comprising a light mixing/branch-filtering device and a second coupling portion comprising a light branching/coupling device.

7. An optical coupler, comprising:

at least three optical fibers, at least one coupling portion, the at least one coupling portion comprising at least two of the optical fibers that are fusion-welded and extended to each other, and fixing means for fixing the at least one coupling portion to the rest of the optical fibers to form a single bundle.

8. The optical coupler of claim 7, comprising at least two coupling portions and a single mount member to which both of the at least two coupling portions are fixed.

9. The optical coupler of claim 8, wherein the fixing means comprises at least two substrates on which respective coupling portions are fixed, wherein both of the coupling portions are fixed to the single, common mount member through the substrates.

10. The optical coupler of claim 7, comprising at least two coupling portions and at least two mount members, each one of the coupling portions being fixed to a corresponding one of the mount members.

11. The optical coupler of claim 7, wherein the fixing means comprises a substrate for the at least one coupling portion.

12. An optical coupler, comprising:

at least three optical fibers arranged side by side, a plurality of coupling portions, each one of the coupling portions comprising at least two adjacent optical fibers that are fusion-welded and extended to each other, and a single mount member within which all the coupling portions are fixed, wherein all the coupling portions are substantially completely surrounded by the single mount member, and wherein the coupling portions are fixed onto respective substrates located adjacent to each other in a longitudinal direction with respect to the optical fibers, and all of the substrates are fixed to the single mount member.

13. A process of manufacturing an optical coupler comprising a plurality of optical fibers, the process comprising the steps of:

(a) selecting at least two of the plurality of optical fibers and fusion-welding and extending the selected optical fibers to form a coupling portion, (b) fixing the coupling portion onto a substrate, (c) repeating steps (a) and (b) to provide a plurality of coupling portions fixed onto a plurality of substrates arranged adjacent to each other in a longitudinal direction with respect to the optical fibers, and (d) fixing all of the substrates onto a single common outer casing.

14. The process of claim 13, comprising the step of covering all of the substrates with the outer casing.

15. The process of claim 13, comprising the step of preventing a coupling portion from being formed longitudinally between previously formed coupling portions during step (c).

* * * * *